Jan. 16, 1968  T. P. HUDEN  3,363,935
AUTOMOBILE SEAT LOCK
Filed Aug. 31, 1966
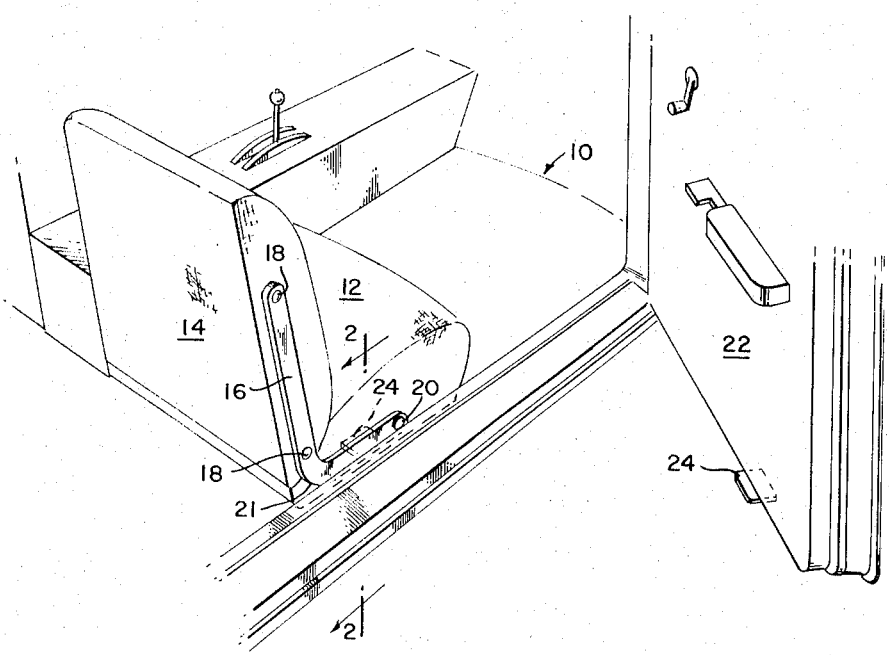
FIG__1
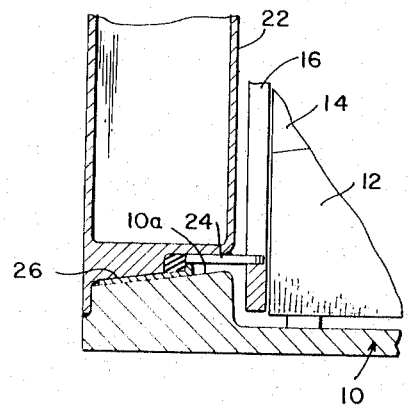
FIG__2
THOMAS P. HUDEN
INVENTOR.
BY *Seed & Berry*
ATTORNEYS " # United States Patent Office 3,363,935
Patented Jan. 16, 1968

3,363,935
AUTOMOBILE SEAT LOCK
Thomas P. Huden, 326 W. Mercer,
Seattle, Wash. 98119
Filed Aug. 31, 1966, Ser. No. 576,319
2 Claims. (Cl. 296—65)

ABSTRACT OF THE DISCLOSURE

A seat back locking tab is attached to the door of a vehicle and cantilevered inwardly such that the tab will overlay the seat back hinge lever to restrain the seat back when the door is closed.

This invention relates to safety devices for passenger vehicles and more particularly to devices for preventing forward movement of folding seat backs when the adjacent vehicle door is closed.

The primary object of this invention is to provide a safety device for ensuring that folding seat backs, as in two-door passenger vehicles, are restrained from forward movement when the vehicle is suddenly stopped. Another object is to provide such a device that functions automatically when the adjacent vehicle door is closed. A further object is to provide such a device which is attached to the door and which has no moving parts susceptible of malfunction.

These and other objects and advantages of this invention will become apparent from a consideration of the following disclosure and the accompanying drawing, in which:

FIG. 1 is a perspective view of the interior of a passenger vehicle with its door open which illustrates the invention; and FIG. 2 is a cross-section taken along the lines 2—2 of FIG. 1 illustrating the operation of this invention with the door closed.

As shown in FIG. 1, a passenger vehicle comprises a body 10 within which a seat 12 is mounted to the body floor, and a corresponding folding seat back 14 pivotably connected to the seat 12 by means of a pair of L-shaped lever arms 16. Lever arm 16 is rigidly attached to the ends of the seat back at 18 and pivotably pinned to the end of the seat at 20 (only the outer ends of the seat and seat back being shown in FIG. 1). A door 22 is hingeably mounted in the usual manner and is provided on its underside with a locking plate tab or member 24. The locking tab 24, when the door 22 is closed, extends over the top of the midsection of the horizontal leg of the lever arm 16, as shown in dotted line in FIG. 1, in contiguous contact with the upper side of such lever arm section. Closing door 22 thereby locks the lever arm 16 in position with the seat back 14 upright inasmuch as the lever arm 16 cannot pivot upward beyond locking tab 24.

The location of the locking tab 24 on the door relative to the location of the horizontal leg of the lever arm 16 is not critical so long as the locking tab 24 will close on the horizontal leg of the seat pivot point 20. Of course, locating the locking tab 24 further back toward the elbow 21 of the lever arm will increase the restraining leverage that the locking tab 24 can exert to keep the seat back 14 upright.

As shown in FIG. 2, the locking tab 24 is preferably attached, by means such as bolts or welding, to the underside of the door 22 such that it just clears the doorway sill 10a. By cantilevering the locking tab 24 from the door underside inward to the lever arm 16, the locking tab 24 can exert maximum restraining force without damaging the door.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. In a vehicle having a seat, a folding back section, a hinge lever fixedly attached to said folding back section and pivotably attached to said seat, and a door providing access into said vehicle adjacent said seat and folding back section, the combination therewith of locking means attached to said door and adapted to restrainably engage said hinge lever when said door is closed to prevent folding movement of said folding back section, wherein said hinge lever is an L-shaped lever arm and wherein said locking means comprises a tab cantilevered inwardly from said door a sufficient distance to extend across the horizontal leg of said lever arm when said door is closed, said tab being so positioned on said door as to contact said horizontal leg rearward of the seat pivot point.

2. A vehicle according to claim 1 wherein said tab is connected to the underside of said door such that it just clears the doorway sill.

References Cited

UNITED STATES PATENTS

| 2,760,813 | 8/1956 | Colm | 296—65 |
| 2,624,613 | 1/1953 | Parmely | 296—65 |
| 2,952,490 | 9/1960 | Pfaff | 296—65 |

BENJAMIN HERSH, Primary Examiner.

J. H. BRANNEN, J. A. PEKAR, Assistant Examiners.